United States Patent [19]

Devening

[11] 4,263,705

[45] Apr. 28, 1981

[54] DOWEL PIN PULLER

[76] Inventor: Kenneth Devening, 6622 Bramble, Cincinnati, Ohio 45227

[21] Appl. No.: 117,873

[22] Filed: Feb. 4, 1980

[51] Int. Cl.[3] .............................................. B23P 19/04

[52] U.S. Cl. ...................................................... 29/256

[58] Field of Search ................. 29/256, 261, 250, 244; 254/22, 26 E; 81/367, 370, 371, 418, 425 R, 425 A

[56] References Cited

U.S. PATENT DOCUMENTS

| | | | |
|---|---|---|---|
| 715,014 | 12/1902 | Burgess | 81/425 X |
| 1,519,067 | 12/1924 | Smith | 29/256 |
| 1,599,738 | 9/1926 | Atkins | 29/261 |
| 1,891,164 | 12/1932 | Klüglein | 254/22 |
| 2,489,895 | 11/1949 | Kash | 81/370 |
| 2,607,110 | 8/1952 | Labounsky | 29/256 X |

*Primary Examiner*—Robert C. Watson

*Attorney, Agent, or Firm*—Wood, Herron & Evans

[57] ABSTRACT

A hand tool for removing dowel pins from a tool block comprising a commercially available adjustable locking type of pliers modified by special jaws and the addition of a novel jack mechanism. The special jaws are flat jaws having longitudinally extending V-shaped grooves therein, and the novel jack mechanism comprises a puller pin extending through the handle lever of the adjustable locking pliers and having jack screws threaded therethrough on opposite sides of the handle lever such that the screws are operative to apply a thrust between the dowel pin supporting block and the puller pin with its attached tool jaws.

7 Claims, 5 Drawing Figures

DOWEL PIN PULLER

This invention relates to hand tools and more particularly, to a hand tool for use in removing dowel pins from a machine base or master plate.

In the machine tool industry, fixtures, dies, and tooling plates are commonly used to support workpieces relative to some reference plane on a machine. To precisely locate the fixtures relative to the reference or data plane, the machine upon which the fixture or die is mounted commonly includes a base plate or so-called master plate within which there are located a series of dowel pins. Those pins usually occur in pairs such that fixtures or dies to be precisely located on the machine need only be placed over a pair of those dowel pins and thereby precisely located with reference to the reference or data plane of the machine.

In the event that the fixture or die becomes damaged or broken, the broken die or fixture must be removed from the base plate by lifting it off the dowel pins. Thereafter, the fixture can be repaired and replaced upon the dowel pin. But, before a fixture can be placed upon a pair of dowel pins, the surface of the base plate surrounding those dowel pins must be completely cleaned of chips, grit, or any foreign matter which would interfere with precise location of the fixture on the master plate. To effect that cleaning, the dowel pins must be removed from the base plate and the surface cleaned by stoning and wiping it perfectly clean. Only then can the dowel pins be replaced and the die or fixture placed atop the pins.

At the present time many difficulties occur in removing dowel pins from a base or master plate. In order to precisely locate those pins within the plate, they are usually force or interference fit into the dowel pin holes, usually by lightly tapping them into place with a hammer. It is therefore difficult to remove those pins from the master plate when it becomes necessary to do so. Common practice today is to grip the dowel pin with some form of pliers while the pliers are located on the surface of the master plate and the jaws of the pliers are wrapped around the dowel pin. A screw driver or some other tool is then usually inserted beneath the pliers and, while the pliers are gripping the surface of the dowel pin, pried away from the surface of the master plate. If this technique is unsuccessful, a crane or some other heavy lifting device is used to lift the master plate from the machine base and the dowel pins are then tapped out of the hole from the back side of the master plate. Thereafter, the master plate must be relocated with reference to the reference or data plane of the machine, the pliers and screw driver marred surface must be cleaned and stoned so as to remove all scars, and the dowel pins repositioned within the dowel pin hole. All of this effort in removing the dowel pins results in considerable down-time of the machine as well as a large waste of expensive skilled labor.

It has therefore been an objective of this invention to provide a hand tool capable of removing dowel pins from a base or master plate of a machine in a minimum of time and with a minimum of down-time of the machine or table upon which the dowel pin supporting base or master plate is located, and with a minimum of surface damage to the dowel pin supporting plate.

I have achieved this objective by modifying a commercially available adjustable locking pliers (commonly known as a "Vise Grip") so as to enable that tool to pull dowel pins from master plates without damaging the pin or the plate. To that end I have provided this tool with a pair of jaws having longitudinal V-shaped grooves therein adapted to grip the pin in a longitudinal or axial direction by making line contact with opposite sides of the pin. I have also modified that commercially available hand tool by providing it with a puller pin which extends through the tool and supports a jack such that the puller pin and attached jaws may be moved away from the surface of the dowel pin supporting block while the jaws tightly grip the dowel pin. In the preferred embodiment, the jack comprises a pair of screws threaded through the puller pin and operable, when rotated, to apply a thrust or force between the puller pin and the dowel pin block to pull the dowel pin from the block.

The primary advantage of this invention is that it enables dowel pins to be removed from master plates or blocks very quickly and with a minimum of damage to the dowel pin supporting block. It thereby minimizes machine down-time as well as the cost of labor to remove the dowel pin, clean the surface of the dowel pin supporting plate, and replace the dowel pin within the plate.

This invention also has the advantage of comprising a commercially available tool which is only slightly modified so as to convert it to a dowel pin puller. Specifically, all that is required is the addition of a puller pin extending through a lever arm of the adjustable locking pliers and the substitution of a pair of new jaws for the jaws supplied on this commercial tool. The jacks may then be threaded through the puller pin and the tool is ready to be used as a dowel pin puller. Consequently, the tool is a relatively inexpensive modification of an existing tool rather than a whole new tool.

These and other objects and advantages of this invention will be more readily apparent from the following description of the drawings in which.

Figure 1:
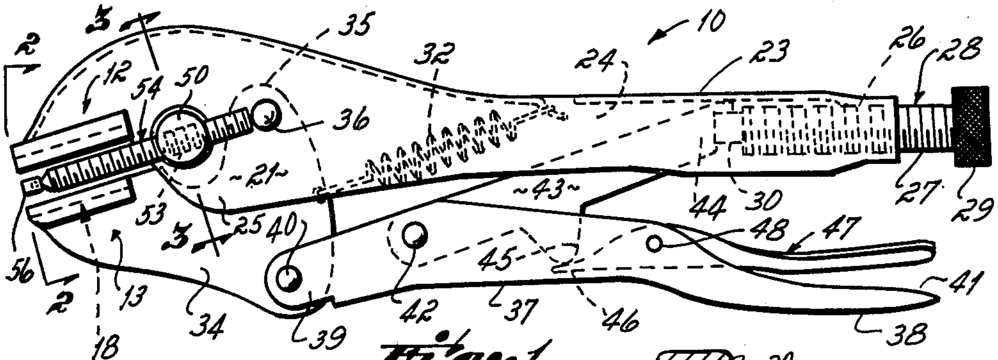
FIG. 1 is a plan view of a dowel pin puller constructed in accordance with the principles of my invention.

With reference to the drawings it will be seen that the dowel pin puller 10 of this invention comprises a pair of jaws 12 and 13 for gripping a dowel pin 14 so as to enable the pin to be withdrawn from a base plate or master plate 15. Typically, these dowel pins 14 are force or interference fit into the base plate 15 so that substantial force is required to effect withdrawal of the pin from the plate 15.

Figure 2:
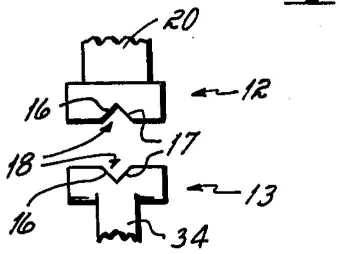
FIG. 2 is an end view of the jaws thereof taken on line 2—2 of FIG. 1.
Figure 3:
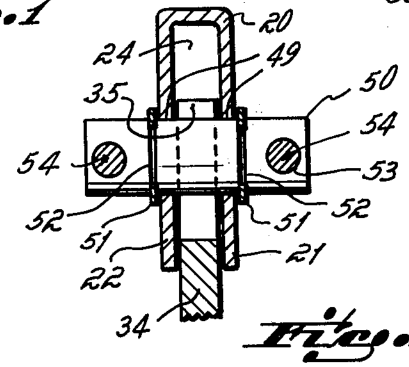
FIG. 3 is a cross sectional view taken on line 3—3 of FIG. 1.

Referring to FIG. 2, it will be seen that each jaw 12, 13 has a generally V-shaped groove 18 extending longitudinally therein. Preferably, this V-shaped groove defines a 90° included angle between the two faces 16 and 17 of the groove 18. When engaged with a dowel pin, the faces 16 and 17 establish longitudinal line contact with the peripheral surface of the dowel pin 14.

The jaw 12 has a handle lever 20 extending generally longitudinally therefrom. This handle lever is substantially channel-shaped in cross section to provide spaced flanges 21 and 22 on the sides of a rounded finger gripping portion 23. The flanges 21 and 22 cooperate with the gripping portion 23 to form an elongated recess 24 opening through the face of the lever in the direction of the other jaw 13. The flanges 21 and 22 project from the body of the handle to form ears 25. The end 20 of the handle lever opposite the jaw is of solid construction and has an internally threaded bore 26 extending substantially coaxially with the handle for receiving the threaded shank 27 of a set screw 28. The set screw has a head 29 on the exterior end thereof whereby the shank is adjustably threaded in the bore 26. The inner end of this set screw terminates in the recess 24 and is provided with a reduced pintle 30.

The other jaw 13 has an arm portion 34 terminating in a laterally extending ear 35 received between the ears 25 of the handle lever 20 of the other jaw. This ear 35 is provided with an opening registering with openings in ears 25 to accommodate a pivot pin such as rivet 36 on which the jaw 13 is pivoted to and from the jaw 12. A spring 32 connected between the arm 34 and the handle lever 20 biases the arm 34 and connected jaw 13 to an open position.

Pivotally mounted on the arm 34 at the side opposite the ear 35 is a handle member 37 having a portion 38 shaped to fit the palm of the hand and having forwardly extending ears 39 spaced apart to accommodate the arm 34. The ears 39 have openings which register with an opening in the arm 34 for accommodating a fastening device such as a rivet 40 such that the handle 37 is pivotally connected with the jaw 13. The handle 37 is also of channel-shaped cross section and has an open side 41 facing the open side of the channel-like recess of the other handle lever 20.

Formed in the handle lever 37, spaced from the pivotal connection 40 of the handle lever with the pivot arm 34, are openings for passing a rivet 42 to pivotally mount a toggle arm 43. The toggle arm has a free end 44 projecting into the recess 24 to engage against the pintle 30 of the adjustment set screw 28. The toggle arm also has a lateral stop 45 projecting from the side thereof adjacent the handle 37. This stop 37 rests atop a finger 46 of a release arm 47. Intermediate its ends, the release arm is pivoted on a pin 48 carried in aligned openings in the arm 37. Raising of the finger 46 effectively raises stop 45 to release the "over-center latch" of pivot 42 between pivot 40 and pintle 30.

Extending through aligned apertures 49 in the lever arm 20 between the jaw 12 and the pivot pin 36, there is a puller pin 50. This puller pin 50 is retained in the apertures 49 by retaining rings 51 located on opposite sides of the lever arm and received within annular grooves 52. The puller pin 50 extends a substantial distance beyond the sides of the lever arm 20 and on each side has a threaded bore 53 extending diametrically therethrough. These bores are parallel one to the other so that swivel screws 54 extending through these bores are parallel one to the other. These screws have conventional swivels 56 mounted on the end thereof for engagement with the surface of the dowel pin mounting plate 15 as is explained more fully hereinafter. At the end opposite from the swivels 56, each swivel screw has a recess adapted to receive an Allen head wrench.

Figure 5:
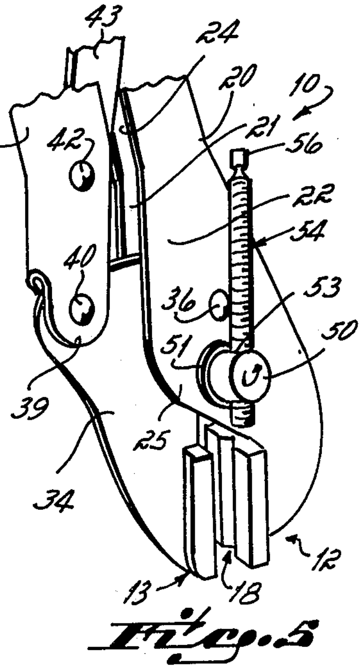
FIG. 5 is a perspective view of the tool of FIG. 1 ready for general utility use for some purpose other than as a dowel pin puller.

The tool 10 described hereinabove is particularly intended for removing dowel pins from dowel pin supporting blocks or master plates 15, but the tool is also useful with the jack screws 54 moved to the position illustrated in FIG. 5. When the screws are so located, the tool 1 may be used in the manner of any other commercially available "Vise Grip" type of pliers, that is, it may be used to grip any sort of object which may be gripped by flat face jaws.

Figure 4:
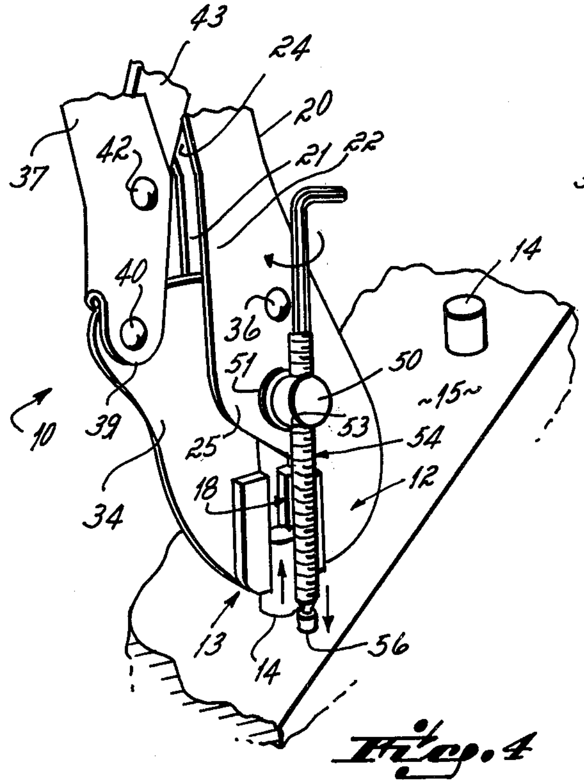
FIG. 4 is a perspective view of the tool of FIG. 1 in operative engagement with a dowel pin.

In removing a dowel pin 14 from a base plate 15, the jaws 12 and 13 are placed over the pin 14 in the manner illustrated in FIG. 4 so that the V-shaped grooves 18 in the jaws are longitudinally aligned with the pin 14 and the faces of the grooves are generally parallel to the axis of the pin. The screw 28 is then adjusted so that when the handle levers 20 and 37 are drawn toward each other to bring the jaws 12 and 13 into gripping engagement with the pin 14, the pivot 42 for the toggle member will spring past dead center position between the handle lever pivot 40 and the pintle 30 of the screw 28 so that the jaws remain in gripping engagement with the dowel pin 14. The jaws 12 and 13 of the tool are then in tight frictional contact with the surface of the pin 14.

The screws 54 are then threaded inwardly until the swivels 56 are in surface contact with the top surface of the dowel pin supporting plate or block 15. After surface contact is established between the bottom of the swivel 56 of the screws 54 and the surface of the dowel pin block 15, the screws 54 are alternately rotated through an arc of between 180° and 270° so as to create a thrust between the screw supporting puller pin and the top surface of the plate 15, as shown by force arrows in FIG. 4. This thrust when alternately applied to the screws has the effect of slowly withdrawing the dowel pin from the supporting block. The dowel pin is thus withdrawn from the block without any damage to the surface of the plate 15. With the dowel pin removed, the top surface of the base plate 15 may be cleaned and prepared for reinsertion of the dowel pin and subsequent mounting of a die, fixture, or tooling plate upon the top surface of the base plate 15.

From the foregoing description it will be readily apparent that I have provided a hand tool which is easily created from an existing commercially available tool without substantial modification of that commercially available tool. Specifically, all that is required to modify the commercially available tool is to utilize the special jaws 12 and 13 described hereinabove and to drill holes 49 in the lever arm 20 to accommodate the puller pin 50. The jack screws 54 may then be threaded into the puller pin and the tool is ready for use as a dowel pin puller.

While I have described only a single preferred embodiment of my invention, persons skilled in this art will appreciate changes and modifications which may be made without departing from the spirit of my invention. Therefore, I do not intend to be limited except by the scope of the following claims:

I claim:

1. A tool for removing dowel pins from a tool block comprising,
  a pair of jaws, each of said jaws having a generally longitudinally extending V-shaped groove adapted to engage and establish longitudinal line contact with the circumferential surface of a dowel pin,
  a lever arm extending generally longitudinally from one of the jaws and generally parallel to the axis of a dowel pin when gripped by said jaws,
  a pivot arm extending from the other jaw substantially in the plane of the lever arm,
  pivot pin means hingedly interconnecting said arms on an axis generally perpendicular to the axis of said dowel pin when said dowel pin is gripped by said jaws, a handle lever pivotally interconnected to the pivot arm and cooperating with the lever arm in positioning the jaws to contact said dowel pin, a toggle lever having pivotal connection with the handle lever and stop engagement with the lever arm, said handle lever being movable toward the lever arm to bring said jaws into gripping engagement with said dowel pin and locate said pivotal connection for the toggle lever in a dead center position between said pivotal connection of the handle lever and the point of stop engagement, a puller pin rotatably mounted within said lever arm at a location on the center line of said dowel pin when said pin is gripped by said jaws, and jack means secured to said puller pin on opposite sides of said lever arm for exerting a thrust between a dowel pin supporting block and said jaw supporting arms to effect withdrawal of a dowel pin from said block when said dowel pin is gripped by said jaws.

2. The tool of claim 1 in which said jack means comprises a pair of rotatable screws threaded through said puller pin.

3. The tool of claim 2 in which each of said rotatable screws has a swivel foot secured to the block contacting end thereof.

4. A tool for removing dowel pins from a tool block comprising, a pair of jaws, each of said jaws having a generally longitudinally extending V-shaped groove adapted to engage and establish longitudinal line contact with the circumferential surface of a dowel pin, a lever arm extending generally longitudinally from one of the jaws, an adjustable stop mounted in said lever arm at the end of said arm remote from said one jaw, a pivot arm extending from the other jaw substantially in the plane of the lever arm, pivot pin means hingedly interconnecting said arms, a handle lever pivotally interconnected to the pivot arm and cooperable with the lever arm to position the jaws, a toggle lever having pivotal connection with the handle lever and stop engagement with said adjustable stop, jack mounting means attached to said lever arm, and jack means secured to said jack mounting means on opposite sides of said lever arm for exerting a thrust between a dowel pin supporting block and said jaw supporting arms to effect withdrawal of a dowel pin from said block when said dowel pin is gripped by said jaws.

5. The tool of claim 4 in which said jack means comprises a pair of rotatable screws threaded through said jack mounting means.

6. The tool of claim 5 in which each of said rotatable screws has a swivel foot secured to the block contacting end thereof.

7. The tool of claim 4 in which said jack mounting means comprises a puller pin which is rotatable relative to said lever arm.

* * * * *